United States Patent
Baker et al.

(10) Patent No.: US 7,095,419 B2
(45) Date of Patent: *Aug. 22, 2006

(54) APPLYING MULTIPLE TEXTURE MAPS TO OBJECTS IN THREE-DIMENSIONAL IMAGING PROCESSES

(75) Inventors: Nicholas R. Baker, Cupertino, CA (US); Jeffrey A. Andrews, Sunnyvale, CA (US); Mei-Chi M. Liu, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/216,251

(22) Filed: Aug. 31, 2005

(65) Prior Publication Data

US 2005/0285873 A1    Dec. 29, 2005

Related U.S. Application Data

(63) Continuation of application No. 10/770,054, filed on Feb. 2, 2004, now Pat. No. 6,975,327, which is a continuation of application No. 09/939,130, filed on Aug. 24, 2001, now Pat. No. 6,741,259, which is a continuation-in-part of application No. 09/822,659, filed on Mar. 30, 2001, now abandoned.

(51) Int. Cl.
*G09G 5/00* (2006.01)

(52) U.S. Cl. .................. 345/582; 345/583; 345/584; 345/545; 345/552

(58) Field of Classification Search ............... 345/582, 345/583, 584, 545, 552
See application file for complete search history.

(56) References Cited

U.S. PATENT DOCUMENTS 6,741,259 B1 * 5/2004 Baker et al. ............... 345/582

* cited by examiner

*Primary Examiner*—Kee M. Tung
*Assistant Examiner*—Tam Tran
(74) *Attorney, Agent, or Firm*—Workman Nydegger

(57) ABSTRACT

Systems and methods for providing multi-pass rendering of three-dimensional objects. A rendering pipeline that includes (N) physical texture units and one or more associated buffers emulates a rendering pipeline containing more texture units (M) than are physically present (N). Multiple rendering passes are performed for each pixel. During each texture pass only N sets of texture coordinates are passed to the texture units. The number of passes required through the pipeline to emulate M texture units is M/N, rounded up to the next integer. The N texture units of the rendering pipeline perform look-ups on a given pass for the corresponding N texture maps. The texture values obtained during the texture passes are blended by texture blenders to provide composite texture values. In successive passes, the buffers are used for temporary data and the most current composite texture values. The process is repeated until all desired texture maps are applied.

8 Claims, 6 Drawing Sheets

APPLYING MULTIPLE TEXTURE MAPS TO OBJECTS IN THREE-DIMENSIONAL IMAGING PROCESSES

CROSS-REFERENCE TO RELATED APPLICATIONS

This application is a continuation of U.S. patent application Ser. No. 10/770,054, filed Feb. 2, 2004 now U.S. Pat. No. 6,975,327, entitled "Applying Multiple Texture Maps to Objects in Three-Dimensional Imaging Processes", which is a continuation of U.S. patent application Ser. No. 09/939,130, filed Aug. 24, 2001, entitled "Applying Multiple Texture Maps to Objects in Three-Dimensional Imaging Processes, now U.S. Pat. No. 6,741,259, which is a continuation-in-part of U.S. patent application Ser. No. 09/822,659, filed Mar. 30, 2001 now abandoned, entitled "Applying Multiple Texture Maps to Objects Using a Single Texture Unit," and which is now abandoned, all of which are incorporated herein by reference.

BACKGROUND OF THE INVENTION

1. The Field of the Invention

The present invention relates to systems and methods for providing multi-pass rendering of three-dimensional graphics. More specifically, the present invention is directed to systems and methods for utilizing one or more texture units and a plurality of associated frame buffers in a rendering pipeline to perform multiple rendering passes, to support the use and storage of extra temporary data, and to blend data from multiple texture maps that is applied to a polygon so as to model a three-dimensional object.

2. Background and Related Art

Adding realism to computer graphics involves rendering an object that has three-dimensional characteristics on a two-dimensional display device. Such three-dimensional characteristics include shadows and variations in color and shade of the object. For each desired three-dimensional characteristic, a specific texture map is applied to a frame of polygons in order to render the object. When multiple characteristics are desired, the corresponding texture maps are blended. Therefore, the blending and applying of various corresponding texture maps renders the object as having the desired three-dimensional characteristics, such as any desired color, pattern, appearance, etc.

A conventional technique for applying multiple texture maps to render a three-dimensional image includes utilizing a single texture unit and a single frame buffer. As multiple passes are performed, the frame buffer is used as the temporary data storage between passes. While such a technique adequately applies light or shadow maps on opaque objects, the conventional technique cannot be adequately utilized for transparent objects since temporary data and current destination pixel data cannot co-exist under the conventional technique.

Another technique for applying multiple texture maps to render a three-dimensional image uses a rendering pipeline that includes a texture unit for every texture map that is applied. The texture units are placed in series within the rendering pipeline, which assembles one or more polygons to represent an object having three-dimensional characteristics and applies multiple texture maps to the assembled polygon. Many effects are only renderable if one or more temporary pieces of data are allowed to exist between texture units of a pipeline. Thus, under this conventional technique, an additional piece of temporary data is passed between the texture units of the rendering pipeline and is fully consumed by the end of the pipeline.

By way of example, FIG. 1 illustrates a conventional rendering pipeline that includes vertex unit 10, setup unit 11, edge walk unit 12, span walk unit 13, z-buffer 14, texture units 15, destination blender 18, and frame buffer 19. In the rendering pipeline, vertex unit 10 assembles data describing the values at each vertex of a polygon. The data includes three-dimensional coordinates, which represent each of the polygons that together model a three-dimensional object, and texture coordinates, the values for which are determined later in the pipeline through a series of texture units. Vertex unit 10 provides the assembled data to setup unit 11, which generates parametric function coefficients for an interpolation of intermediary points between the three-dimensional coordinates. Edge walk unit 12 receives the output of setup unit 11 and determines the starting pixel and the value of the starting pixel for each horizontal row of pixels lying within the bounds of the polygon. Span walk unit 13 then determines the values for all of the pixels for each horizontal row within the polygon. The values determined by edge walk unit 12 and span walk unit 13 are provided to z-buffer 14, which determines whether the pixels are occluded or visible, so that only currently visible pixels are drawn.

A set of texture coordinates representing the various layers of textures that are to be applied to the generated polygons are passed through a series of texture units 15. The number of texture units in series corresponds to the number of texture layers that are to be applied. In the example of FIG. 1, five texture layers are applied to the generated polygons. Other conventional rendering pipelines may include any number of texture units in series to apply the corresponding number of texture maps.

In FIG. 1, each texture unit 15 receives a series of texture coordinate sets for each pixel, performs a texture map look up to obtain the values of the coordinate sets related to a texture map, and performs a blending operation that may include blending the obtained values with values from one or more previous texture maps. Temporary data is passed between the texture units 15 and is fully consumed by the end of the rendering pipeline.

Therefore, with reference to the series of texture units 15 of FIG. 1, texture unit 15a receives a series of texture coordinate sets from z-buffer 14 for each pixel. An example of a series of texture coordinate sets for a given pixel is $(u_0,v_0)$, $(u_1,v_1)$, $(u_2,v_2)$, $(u_3,v_3)$, and $(u_4,v_4)$, where $(u_0,v_0)$ is the texture coordinate set for the first texture map, $(u_1,v_1)$ is the texture coordinate set for the second texture map, $(u_2,v_2)$ is the texture coordinate set for the third texture map, $(u_3,v_3)$ is the texture coordinate set for the fourth texture map, and $(u_4,v_4)$ is the texture coordinate set for the fifth texture map. Because the texture units are in series, the full complement of texture coordinate sets, which, in this example include $(u_0,v_0)$, $(u_1,v_1)$, $(u_2,v_2)$, $(u_3,v_3)$, and $(u_4, v_4)$, are transmitted from z-buffer 14 to texture unit 15a. In this manner, each of the texture units 15a–15e can select the texture coordinate set it needs to perform a texture map look up operation.

The following example illustrates the conventional technique that is currently performed for each pixel. Texture unit 15a takes the texture coordinate set $(u_0,v_0)$ corresponding to the first texture map and performs a look up at texture cache 16a to obtain the texture values for the pixel. Texture blender 17a performs a blending operation to apply the texture values to the pixel corresponding to the first texture map.

Texture unit 15b receives the series of texture coordinate sets for the pixel from texture unit 15a. The texture coordinate set $(u_1,v_1)$, which corresponds to the second texture map, is selected by texture unit 15b and a look up is performed at texture cache 16b to obtain the texture values for the pixel. Texture blender 17b then performs a blending operation, which includes blending the texture values corresponding to texture coordinates $(u_0,v_0)$ and $(u_1,v_1)$, to apply the texture values to the pixel corresponding to the first and second texture maps.

Texture unit 15c receives from texture unit 15b the series of texture coordinate sets for the pixel. The texture coordinate set $(u_2,v_2)$, which corresponds to the third texture map, is selected by texture unit 15c and a look up is performed at texture cache 16c to obtain the texture values for the pixel. Texture blender 17c performs a blending operation, which includes blending the texture values corresponding to texture coordinates $(u_0,v_0)$, $(u_1,v_1)$ and $(u_2,v_2)$, to apply the texture values to the pixel corresponding to the first, second and third texture maps.

Texture unit 15d receives the series of texture coordinate sets for the pixel from texture unit 15c. The texture coordinate set $(u_3,v_3)$, which corresponds to the fourth texture map, is selected by texture unit 15d and a look up is performed at texture cache 16d to obtain the texture values for the pixel. Texture blender 17d performs a blending operation, which includes blending the texture values corresponding to texture coordinates $(u_0,v_0)$, $(u_1,v_1)$, $(u_2,v_2)$ and $(u_3,v_3)$, to apply the texture values to the pixel corresponding to the first, second, third, and fourth texture maps.

Texture unit 15e receives the series of texture coordinate sets for the pixel from texture unit 15d. The texture coordinate set $(u_4,v_4)$, which corresponds to the fifth texture map, is selected by texture unit 15e and a look up is performed at texture cache 16e to obtain the texture values for the pixel. Texture blender 17e performs a blending operation, which includes blending the texture values corresponding to texture coordinates $(u_0,v_0)$, $(u_1,v_1)$, $(u_2,v_2)$, $(u_3,v_3)$ and $(u_4,v_4)$, to apply the texture values to the pixel corresponding to the first, second, third, and fourth texture maps.

The process explained above is performed for each of the pixels and the composite texture values, which are the blended texture values for each pixel corresponding to texture coordinates $(u_0,v_0)$, $(u_1,v_1)$, $(u_2,v_2)$, $(u_3,v_3)$ and $(u_4,v_4)$. After texturing, the pixels are optionally modified by the destination blender 18, which applies optional fog blending, iterated specular blending, and/or alpha blending to the pixels that are then mapped to a frame buffer 19. Once the completed values for all of the pixels are mapped to frame buffer 19, the display device is refreshed with the rendered image.

Another conventional technique for applying multiple texture maps to render a three-dimensional image utilizes a rendering pipeline, such as the rendering pipeline illustrated in FIG. 1, and an extra piece of temporary data that only exists between texture stages. However, with this technique it is possible for the regular multi-texturing type of temporary data to concurrently exist between texture stages since previous texture stages could have other texture lookup proceeding. As such, there are up to two pieces of temporary inter-texture stage data and one piece of destination pixel data in the frame buffer.

Due to significant and sometimes prohibitive amounts of computing resources that are required, including a high demand for memory, conventional rendering techniques are limited to typically two or three texture units rather than the maximum number of eight. As such, the conventional techniques only allow for three stages of multi-texturing and the conventional techniques are limited to one pass through the rendering pipeline unless no extra temporary data is required after each pass, the pixels are opaque, and there is no pixel discarding occurring during each texture stage (e.g. color keying).

BRIEF SUMMARY OF THE INVENTION

The present invention relates to systems and methods for providing multi-pass rendering of three-dimensional graphics. More specifically, the present invention is directed to systems and methods for utilizing one or more texture units and a plurality of associated frame buffers in a rendering pipeline to perform multiple rendering passes, to support the use and storage of extra temporary data and to blend data from multiple texture maps that is applied to a polygon so as to model a three-dimensional object.

Implementation of the present invention includes using a rendering pipeline having one or more texture units and one or more frame buffers to accommodate the application of multiple textures maps onto primitives. The primitives are typically polygons, and usually triangles, that are used to model a three-dimensional object. The values of various parameters used in the rendering process are defined at the vertices of the polygons. These parameters can include $\{x, y, z, 1/w, \alpha, R, G, B, \text{ and } u_i,v_i\}$, where u and v represent the coordinates of a texture map that is applied to the vertex. Multiple textures can be applied to a given triangle and i represents the texture map number that is applied to the polygon.

In contrast to the processes performed by conventional rendering pipelines, the present invention uses one or more texture units and one or more frame buffers to apply multiple texture maps in multiple rendering passes, including supporting destination pixel data and temporary data. As such, implementation of the present invention includes, for example, the ability to read from two frame buffers and to write to one frame buffer per pixel. Furthermore, each frame buffer can have 32-bit per pixel data split into two 16-bit per pixel pieces of temporary data to allow for the support of up to four pieces of temporary data, including the destination pixel data.

Implementation of the present invention includes the ability to render any number of passes (0–8) with the selection of any texture operation. Thus, the present invention allows for up to the maximum number of eight completely general purpose texture passes, including the bump map and premodulation on any pass.

When a polygon is being rendered, a software driver monitors which texture pass is being performed. For each pixel of a frame, the only texture coordinate set obtained by the texture unit during the first pass is $(u_0,v_0)$, which relates to a first texture map. The texture unit looks up a texture value from a first texture map in a texture map library. The texture value corresponds to the $(u_0,v_0)$ texture coordinate set for the pixel, and is stored in a temporary frame buffer.

During a second texture pass for the pixel, the texture unit obtains a texture coordinate set $(u_1,v_1)$, which relates to a second texture map. The texture unit looks up a texture value from a second texture map in the texture map library. The texture value corresponds to the $(u_1,v_1)$ texture coordinate set for the pixel. A texture blender blends the texture value of the pixel located in the temporary frame buffer with the texture value obtained during the second pass and stores the composite texture value for the pixel in a second frame buffer. Alternatively, the texture value obtained during the second pass is not blended with the texture value of the first pass, but is rather stored separately in a second temporary frame buffer. Therefore, implementation of the present invention includes supporting the use and/or storage of extra temporary data. Depending on the texture operations chosen, there are up to two pieces of additional temporary data required between each texture pass and can be supported by implementation of the presenting invention. Thus, for example, there may not be any additional temporary data required between passes 1 and 2, however, two additional pieces of temporary data may be required between two other consecutive passes. A driver examines the texture stage state, decides what additional temporary data is required between passes, and executes the necessary procedure.

The process described above is repeated so as to allow a texture pass to be performed for every texture map that is to be applied onto a primitive. Furthermore, the process is performed for every pixel of a frame. Once performed for every texture map and for every pixel, the composite texture values obtained are blended with the destination pixel data stored in a destination frame buffer for all of the pixels of the frame.

Utilization of the invention in rendering a three-dimensional object reduces the amount of computing resources that are required to render the object. The only texture coordinate set provided to the texture unit during each pass is the texture coordinate set for the particular texture map that is being processed in the pass. Therefore, the elimination of redundant texture coordinate sets for each pixel of every frame optimizes the amount of silicon space (i.e. the gates and wires) that is required. An alternative implementation allows for multiple cycles per pixel to be taken and saved on successive iterations. Texture data is run through one or more texture units multiple times for maximal throughput. As such, in the alternative implementation it is still required to store the extra state for the programmer settings of different texture passes.

Therefore, implementation of the present invention utilizes one or more texture units and one or more frame buffers to render a three-dimensional object. The frame buffers include up to two frame buffers that can be read on each pass and one frame buffer that can be written to on each pass. Further, each buffer can have one piece of data or can be "split" so as to contain two pieces of data. As such, the present invention can accommodate the worst case scenario of one piece of destination frame buffer data and two pieces of texture pass temporary data. Further, each texture pass can write a maximum of two pieces of data, temporary or otherwise, so as to allow for one buffer to be sufficient for which to be written. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both systems and methods for providing multi-pass rendering of three-dimensional graphics. More specifically, the present invention is directed to systems and methods for utilizing one or more texture units and one or more associated frame buffers in a rendering pipeline to perform multiple rendering passes, to support the use and storage of extra temporary data and to blend data from multiple texture maps that is applied to a polygon so as to model a three-dimensional object.

The embodiments of the present invention may comprise a special purpose or general purpose computer including various computer hardware for rendering three-dimensional graphics, as will be discussed in greater detail below. Set top boxes that enhance the capabilities of conventional televisions represent an example of a special purpose computer. Examples of a general purpose computer include a personal computer, a laptop computer, and any other such computer capable of rendering three-dimensional graphics.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Exemplary Operating Environment

Figure 1:
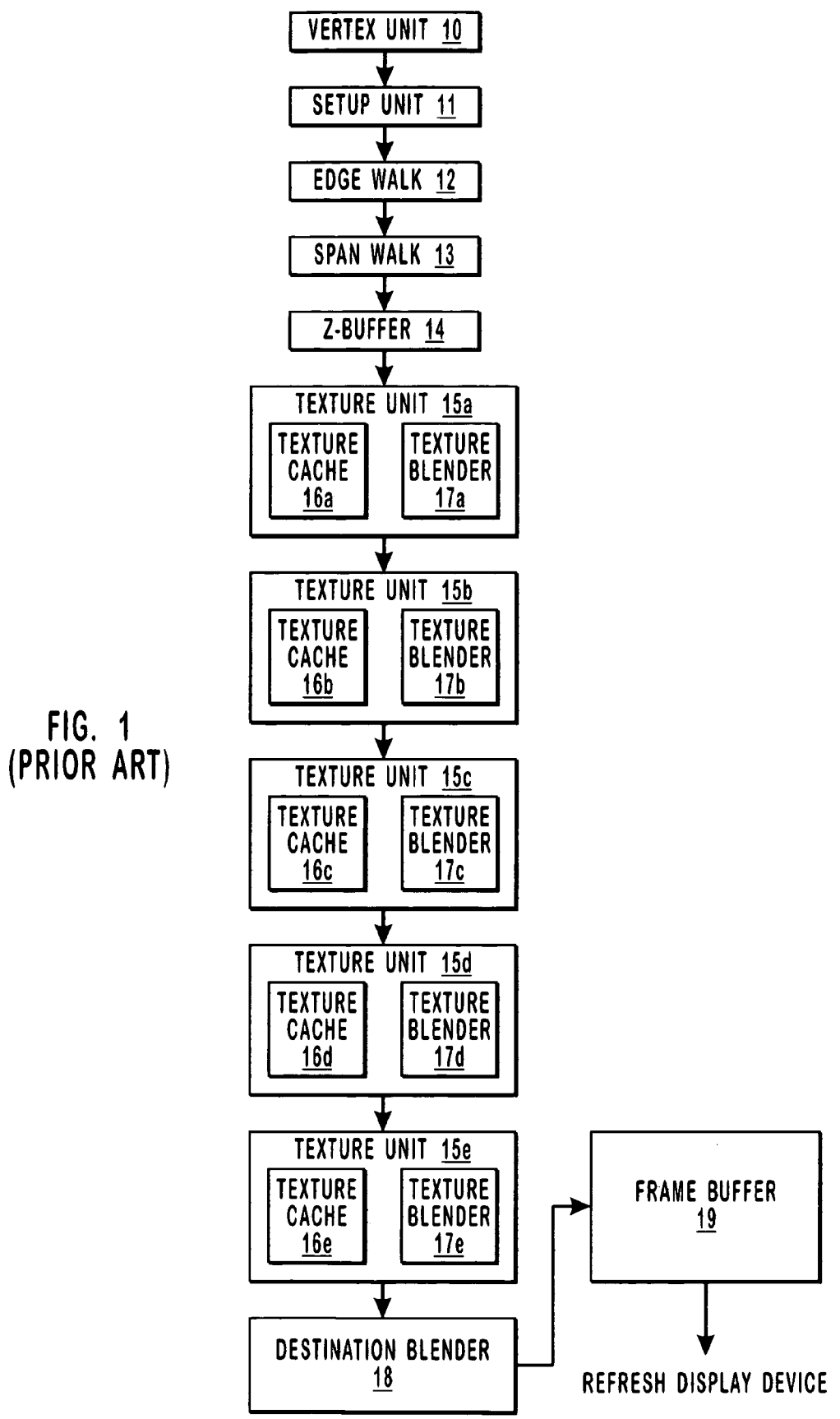
FIG. 1 illustrates a conventional rendering pipeline having a series of texture units for applying multiple texture maps to illustrate a conventional rendering technique for rendering a three-dimensional image.
Figure 2:
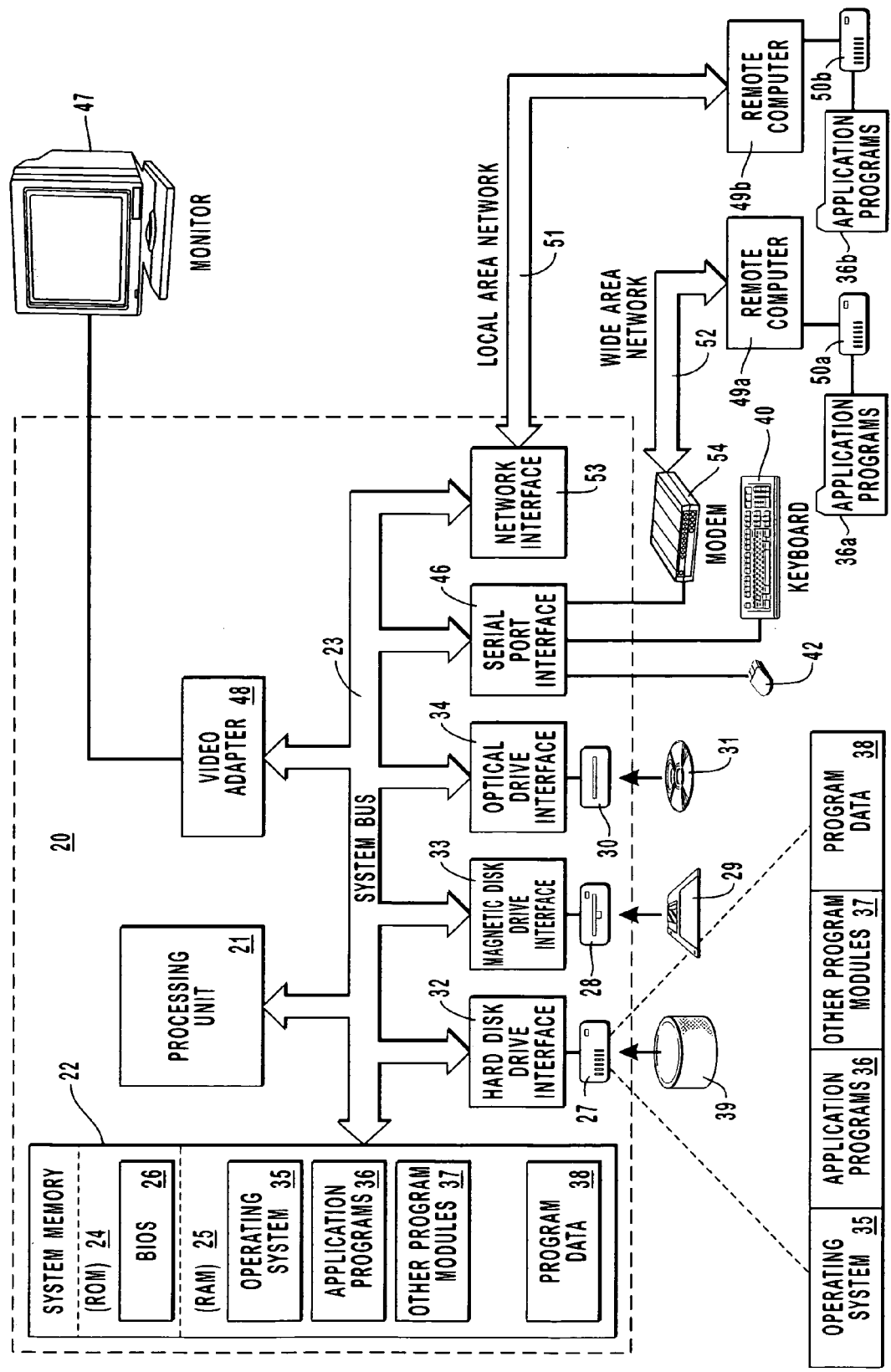
FIG. 2 illustrates an exemplary system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., which perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 2, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

Video adapter 48 generally provides computer 20 with display capabilities, which depend on the logical circuitry provided in video adapter 48 and the capabilities of monitor 47. A video adapter 48 generally provides several different video modes for both text and graphics. In text mode monitor 47 can display only ASCII characters, but in graphics mode monitor 47 can display any bitmapped image. A video adapter 48 may include memory (not shown) so that RAM 25 is not used for storing text and/or graphic displays. Furthermore, a video adapter 48 may include a graphics co-processor (not shown) for performing graphics calculations.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 2. The logical connections depicted in FIG. 2 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

While the exemplary system for implementing the present invention illustrated in FIG. 2 includes a general purpose computing device in the form of a conventional computer, those skilled in the art will appreciate that the present invention may be practiced in a variety of different systems for rendering three-dimensional graphics. For example, another system for implementing the present invention includes a special purpose computer in the form of a WebTV® set-top box or similar Internet terminal that has been adapted to perform operations that include composing, sending and receiving email, browsing the World Wide Web ("Web"), accessing other segments of the Internet, and otherwise displaying information.

Rendering Three-Dimensional Objects/Graphics

Rendering three-dimensional graphics in accordance with the present invention includes utilizing primitives to model the three-dimensional objects. The primitives are the basic framing models of the three-dimensional objects and are typically made of polygons, which are often triangles. Once the polygons are assembled, the pixels that are to be included in the polygons are identified and data from texture maps is applied to the polygons to render the three-dimensional objects.

A texture map is a graphical image data structure. Each texture map contains graphical image data that can be used to generate text, pictures, graphical patterns, lighting effects, etc. The graphical image data can be mapped to individual pixels to render images. Furthermore, a plurality of texture maps can be used to map image data to pixels in order to render images with multiple characteristics, where each characteristic is obtained from one or more texture maps.

A plurality of texture maps are located in a texture map repository or library so as to be accessible by a texture unit. The image data of a texture map is mapped to (x,y) pixel coordinate positions of the polygons constructed in a rendering pipeline, as will be further explained below. An additional discussion as to the use of texture maps is provided in U.S. patent application Ser. No. 09/154,181, entitled "DECOMPRESSING AND COMPOSITING GRAPHICAL IMAGE DATA," filed Sep. 16, 1998, which is incorporated herein by reference.

Figure 3:
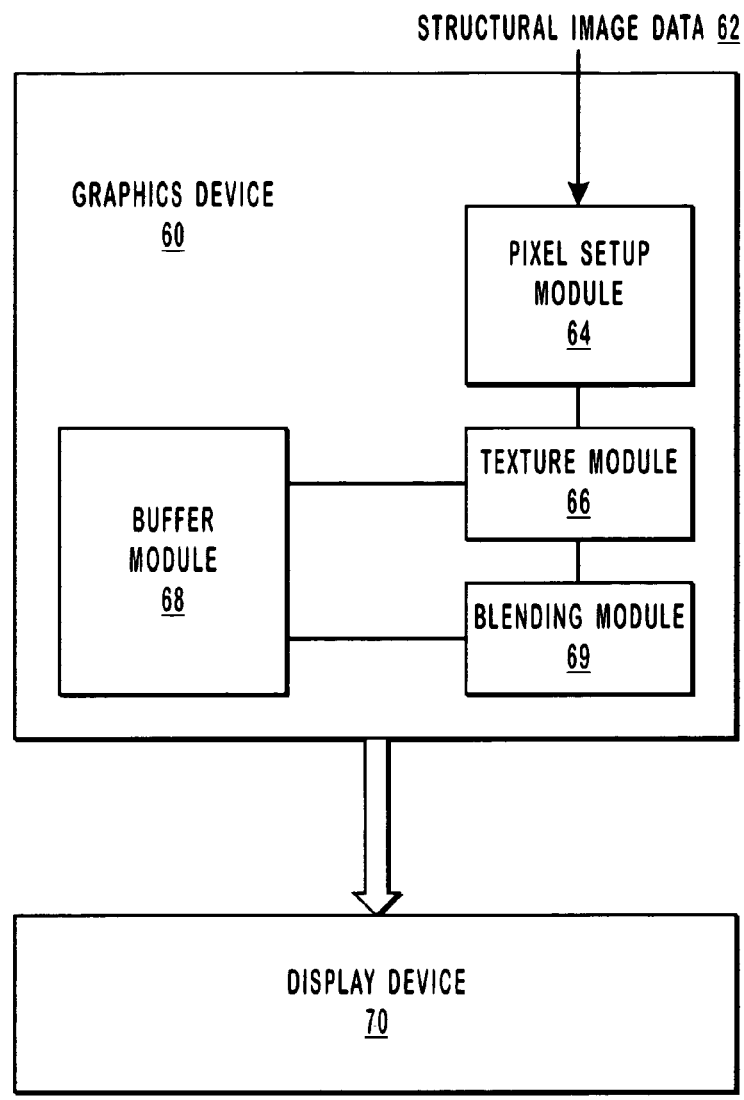
FIG. 3 illustrates an exemplary relationship between various modules to perform multi-pass rendering and to store and/or blend texture data from the passes.

A process that renders three-dimensional objects in accordance with the present invention may be embodied in software as a set of modules or in hardware as a set of processors. Therefore, for illustration purposes, FIG. 3 provides an exemplary relationship among various software modules to perform a process of multi-pass rendering of three-dimensional objects in accordance with the present invention. The process is generally implemented on a graphics device 60 so as to display the three-dimensional objects on a display device 70. An example of a graphics device 60 is video adapter 48 of FIG. 2.

Figure 4:
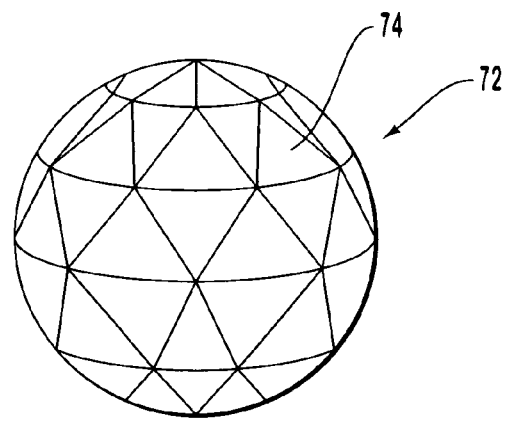
FIG. 4 illustrates an exemplary basic framing structure that is assembled and used to render a three-dimensional object.

In FIG. 3, structural image data 62 is provided to a pixel setup module 64. The structural image data includes information specific to the basic framing structure required to model a three-dimensional object, such as object 72 of FIG. 4. The basic framing structure is generally referred to as a "primitive," which is typically a triangle, but can also be another polygon. An example of a primitive is illustrated in FIG. 4 as primitive 74, which is a basic framing structure for a three-dimensional sphere. Object 72 is made up of a plurality of primitives 74, most of which are triangles, to provide the needed shape to render a three-dimensional sphere.

The structural image data 62 of FIG. 3 provides coordinate information that corresponds to the various primitives of an object to allow the object, such as object 72 of FIG. 4, to be assembled and used to model a three-dimensional object. Once the primitives are assembled, pixel setup module 64 identifies the pixels of a frame that are to be included in the various primitives of the object.

The discrete positioning and relatively low resolution of pixels on a display device cause the vertices of the various polygons to often not correspond directly with a pixel position. Accordingly, the positions of the pixels to be lighted on the display device to model the object usually do not precisely correspond to the positions of the vertices of the various polygons. Therefore, pixel setup module 64 performs a process of iteratively identifying points that lie within or at the boundary of various polygons and correspond to integer pixel positions. In other words, the coordinates defining the polygons are adjusted to integer pixel positions at the screen of the display device, as will be further explained below.

Once each polygon of the object is assembled and the corresponding pixels are identified, texture maps are referenced and applied to the pixels to render the three-dimensional model. The texture maps are located in a map repository or library and texture module 66 performs a look up of the texture coordinate values from the texture map for every pixel identified in pixel setup module 64. The texture coordinate values looked up for each pixel are stored by buffer module 68, as will be further explained below. When multiple texture characteristics are desired, such as a base color and a light source overlaid on the base color, one or more texture maps are utilized for each desired texture characteristic in order to obtain texture coordinate values for the identified pixels. Thus, for many simple effects, for example, if two texture characteristics are desired (i.e. a base color and a light source), two texture maps are referenced. Texture module 66 may also perform other, more complicated operations that require the use of a plurality of texture stages, whereupon an operation is performed in each stage. One such example is the utilization of the Direct3D® BUMPMAP and BUMPMAPENV texture operators, where the first stage of BUMPMAP looks up texture data that has been encoded in a texture stored in memory. The texture data is transformed by a matrix to allow the texture to be statically used. The result of the transform is added to a second texture stage's texture coordinates, thereby changing the locations that are to be looked up during the second stage. In this example of a more complicated lighting/material property effect, two textures are required to produce a single effect.

The texture values from the two texture maps for a pixel are blended by blending module 69 and the resulting composite texture coordinate value for the pixel is stored by buffer module 68. Each of the processes of looking up, blending and storing texture coordinate values for pixels is further explained below. Once the texture coordinate values for all of the desired texture maps have been looked up, blended and stored, the final composite texture coordinate values preserved by buffer module 68 are used to refresh the screen of display device 70 in order to render the desired three-dimensional object.

Figure 5A:
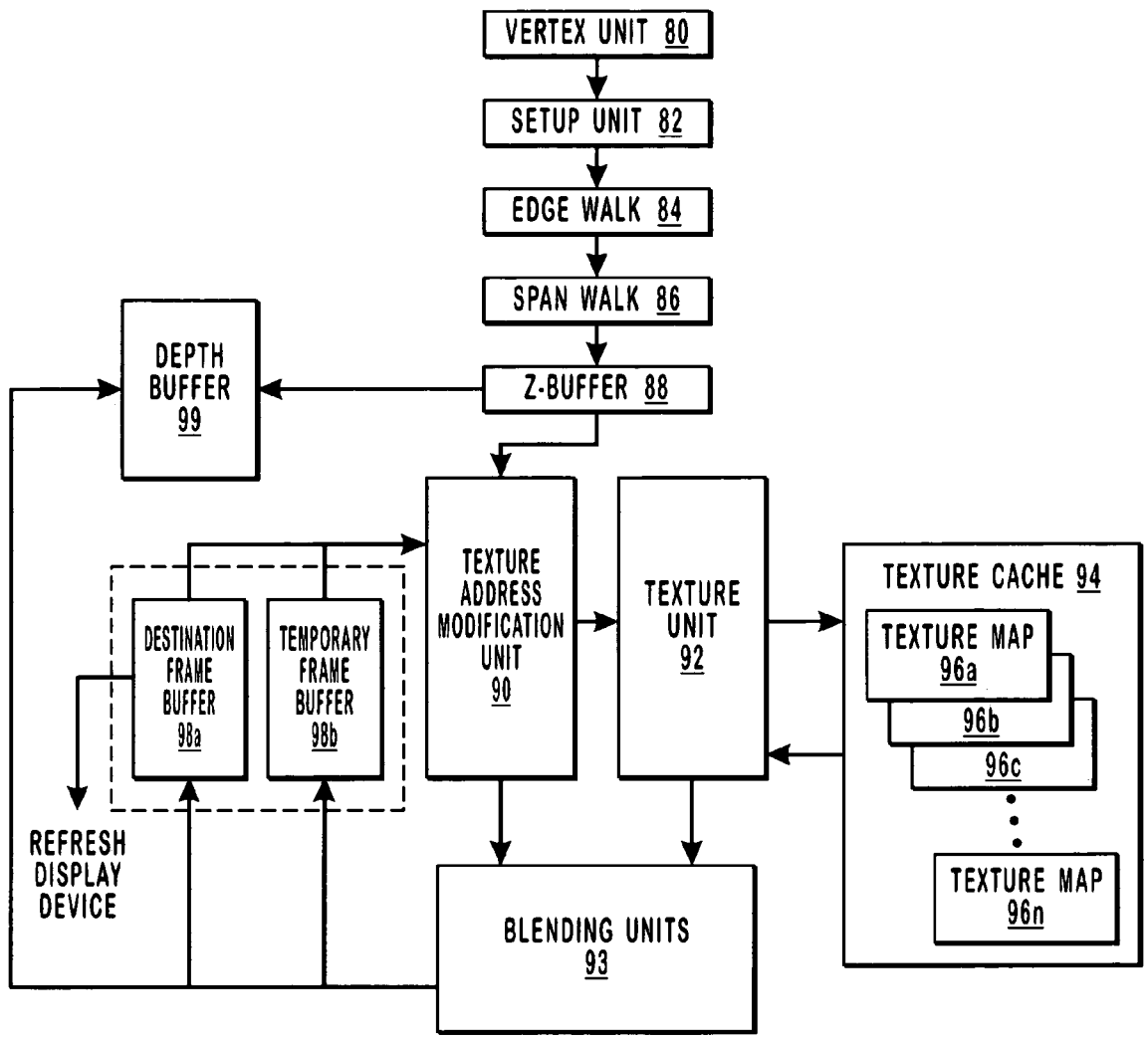
FIG. 5A illustrates an exemplary rendering pipeline in accordance with the present invention that is utilized by the various modules illustrated in FIG. 3.

FIG. 5A illustrates an exemplary rendering pipeline in accordance with the present invention for performing the process explained above by the various modules illustrated in FIG. 3. The rendering pipeline assembles polygons, identifies the pixels that are to be included in the polygons, the currently non-occluded pixels, and applies texture characteristics from texture maps to the assembled polygons in order to render the three-dimensional objects.

Various parameters are used in the rendering process by the rendering pipeline and once the values are established, the parameter values are sent as part of a write command in order to display the three-dimension object on a display device. The various rendering parameters include x, y, z, 1/w, α, R, G, B, and $(u_i, v_i)$. As provided above, the coordinates of the vertices of the polygons are represented by the coordinates x, y, and z to establish the position of the polygon in three-dimensional space. When rendering a three-dimensional object on a two-dimensional display screen, the coordinate z, which corresponds to depth, is projected and therefore is not linear on the two-dimensional display screen. As such, the parameter 1/w, which is a homogeneous coordinate, is utilized in texturing the polygon. The parameter cc is a blending coefficient that is commonly used to define the transparency of a texture image. The α parameter could also be encoded with a fog contribution calculated by the lighting section of the transformation and lighting module. The parameters R, G, B represent the red, green and blue luminous intensity values associated with the particular vertex. When texture maps are used to generate the perception of color on rendered objects, the R, G, B parameters have null values or, alternatively, have values that are selected to complement the images obtained from the texture maps. The R, G, B parameters could also be encoded with unit vector coordinates. The parameters u and v represent the coordinates of a texture map, where i represents the number of texture maps applied to the polygon. The value of i can be 0, 1, 2, 3, 4, 5, 6, or 7 assuming that the rendering system can accommodate eight texture maps, although the number of texture maps is not critical to the invention. In other words, up to eight texture maps may be applied to the polygon. The values of the various parameters used in the rendering process are defined at the vertices of the polygons.

In FIG. 5A, the rendering pipeline includes vertex unit 80, setup unit 82, edge walk unit 84, span walk unit 86, z-buffer unit 88, one or more texture address modification units 90, one or more texture units 92, one or more blending units 93, one or more frame buffers 98, texture cache 94 and depth buffer 99. In response to a command from a user or a software application to render a three-dimensional object, vertex unit 80 reads a command list that is stored in memory (not shown) and assembles data that describes the three-dimensional values of each vertex of a polygon. The vertex data is passed from vertex unit 80 to setup unit 82 and is expressed in terms of a coordinate system defined by the pixel array of the eventual display screen. As provided above, due to the discrete positioning and relatively low resolution of the pixels, the vertices of a triangle often do not correspond directly with a pixel position. Accordingly, the positions of the pixels to be lighted on the display screen usually do not precisely correspond to the positions of the triangle vertices. Therefore, setup unit 82 takes the vertex information for a polygon from vertex unit 80 and computes a few parameters needed by edge walk unit 84 and span walk unit 86 to identify the pixels that are included within the polygon and to perform an interpolation process whereby the values of z, 1/w, α, R, G, B, and $(u_i, v_i)$ are calculated for the pixel positions based on the value of these parameters at the vertices to perform the process described in greater detail below.

Edge walk unit 84 performs an iterative process of identifying points that lie within or at the boundary of the triangle and correspond to integer pixel positions. Thus, edge walk unit 84 determines the starting pixel along with the interpolation parameters of the starting pixel for each horizontal row of pixels lying within the bounds of the polygon. The pixels and the interpolated parameters for all of the pixels of each horizontal row within the polygon are determined by span walk unit 86.

The coordinates of the pixels and the interpolated parameters are provided to z-buffer unit 88, which is a buffer that is large enough to contain a single depth coordinate value for every pixel that is used to render an image. When a rendering pipeline determines that a pixel is to be used to represent a point of a primitive, the depth value of the point that is presented by the pixel is transferred to the z-buffer unit 88. Further information relating to the operation of units 80, 82, 84, 86 and 88 is provided in U.S. patent application Ser. No. 09/164,003, entitled "SYSTEM AND METHOD FOR ADJUSTING PIXEL PARAMETERS BY SUBPIXEL POSITIONING," filed Sep. 30, 1998, and U.S. patent application Ser. No. 09/584,463, entitled "IDENTIFYING SILHOUETTE EDGES OF OBJECTS TO APPLY ANTI-ALIASING," filed May 31, 2000, both of which are incorporated herein by reference. It is noted that units 80, 82, 84, 86 and 88 are described herein as one example of the components of a rendering pipeline that are used for identifying the parameters of a polygon in preparation for applying multiple texture maps to the polygon and that the multiple pass rendering processes of the invention can be practiced in rendering pipelines that include other units.

Embodiments of the present invention utilize one or more texture units and one or more associated frame buffers in a rendering pipeline. While the rendering pipeline illustrated in FIG. 5A includes only one texture unit, more than one texture unit may be included in the pipeline to perform separate stages of rendering operations, as indicated above. Therefore, in one embodiment of the present invention, when it is desirable to have a rendering engine to appear to have up to eight texture units, the rendering pipeline only includes one or two texture units that are utilized in such a way as to appear as up to eight texture units.

In FIG. 5A, a single texture unit and multiple frame buffers are respectively illustrated as texture unit 92 and frame buffers 98. Texture unit 92 is used to access texture maps and apply texture coordinate values in multiple rendering passes and frame buffers 98 store data. Destination frame buffer 98a stores destination pixel data that needs to co-exist with temporary data, stored in a temporary frame buffer 98b, from the passes in order to accommodate the blending of the multiple texture maps that are applied so as to model a transparent three-dimensional object. As such, embodiments of the present invention can read from two frame buffers and write to one frame buffer per pixel. Furthermore, each frame buffer can have the 32-bit per pixel data split into two 16-bit per pixel pieces of data. Therefore, embodiments of the present invention also support three pieces of temporary data and one piece of destination pixel data per pixel.

The process for mapping textures to polygons is performed by texture unit 92, frame buffers 98, texture cache 94, and blending unit 93. While the process is performed on many pixels at the same time in order to improve performance, the result is the same as if it were performed on one pixel at a time. In general, texture unit 92 receives the implicit x and y coordinates of a pixel and the corresponding u and v texture coordinate values defining a portion of the texture that is to be mapped to the pixel. When the pixel being processed is positioned at a vertex of a polygon, the process of identifying the u and v texture coordinate values is relatively simple, and involves merely applying the $(u_i, v_i)$ texture coordinate values that were explicitly defined at the vertex. However, when a pixel positioned at a location other than a vertex of a polygon is processed, the appropriate u and v coordinates to be used to map the texture to the pixel are generated by the units 80, 82, 84, 86, and 88 of the rendering pipeline of FIG. 5A using an interpolation processed based on the ($u_i,v_i$) texture coordinate values that were explicitly defined at the vertices of the polygon. In this manner, texture unit 92 receives the implicit x and y coordinates of pixels and the explicitly defined or interpolated u and v texture coordinate values after they may have been added to the Δu, Δv values, by the texture address modification unit 90, which result from a matrix transform of the original bump map data look up.

When a polygon is being rendered, a software driver monitors which texture pass is currently being performed. While up to eight or more texture passes may be performed for each pixel of a frame, the following example references a situation where three texture passes are performed for each pixel of a frame. The destination pixel data is stored in the destination frame buffer 98*a*. In the first texture pass for a particular pixel in the polygon, the only u, v texture coordinates sent to texture unit 92 are ($u_0,v_0$). The texture coordinate value is obtained by looking up the value in a desired texture map, such as texture map 96*a*, located in a texture map repository or library of texture cache 94. Therefore, texture unit 92 looks up a texture coordinate value for the pixel in texture map 96*a* of texture cache 94 using the texture coordinates ($u_0$, $v_0$) and blending units 93 store the texture value (e.g. R, G, B color values) associated with the texture coordinates in a temporary frame buffer, such as temporary frame buffer 98*b*.

In the second texture pass for the particular pixel, the ($u_1,v_1$) texture coordinates are passed to texture unit 92, which looks up a texture coordinate value for the pixel in a second texture map, such as texture map 96*b* of texture cache 94, using the texture coordinates ($u_1$, $v_1$). Since texture values associated with a previous texture map was obtained for the pixel from a previous pass, blending units 93 blend the texture values for the pixel obtained in the first pass and stored in the temporary frame buffer 98*b* with the texture value for the pixel obtained in the current pass. The blending of the two sets of texture values results in a composite texture value, which is stored in temporary frame buffer 98*b*.

In the third and final texture pass for the particular pixel, the ($u_2,v_2$) texture coordinates are passed to texture unit 92, which looks up texture values for the pixel in a third texture map, such as texture map 96*c* of texture cache 94, using the texture coordinates ($u_2$, $v_2$). Since composite texture values have been obtained for the pixel from blending the texture values from the two previous pass, blending units 93 blend the composite texture value for the pixel that is stored in the temporary frame buffer 98*b* with the texture values for the pixel obtained in the current texture pass. The blending of the values results in composite texture values that include the texture values obtained from all three passes and is then optionally further blended by blending units 93 with the destination pixel data stored in destination frame buffer 98*a*. As such, an act of modifying the destination pixel data extends to any blending operation between the destination pixel data and texture data from one or more passes or any subsequent texture data that is derived therefrom. The resulting composite texture values for a particular pixel are a set of color luminous intensity values (e.g. R, G, B) that are used to control the pixel on the display device when a frame of the display device is refreshed.

While the rendering pipeline of FIG. 5A illustrates the use of two frame buffers that are used to store data, embodiments of the present invention allow for more than two frame buffers to be utilized to store data. As an example, reference is made to FIG. 5B that illustrates a portion of another rendering pipeline, which includes various collections of modular texture pass units, wherein each collection comprises a sufficient set of computing resources to look up and apply a texture contribution. A collection of modular texture pass units comprises, for example, a texture address modification unit, a texture unit, and a blending unit. The various collections of modular texture pass units are cascaded N times to result in an embodiment of the present invention with N physical texture stages. The embodiment still presents the same application programming interface behavior of M apparent texture stages by executing multiple passes of the N physical stages until the desired number of apparent texture stages is achieved. As such, embodiments of the present invention may present the same application programming interface functionality to an application programmer regardless of the actual number of collections of modular texture pass units, assuming at least one such physical collection of modular texture pass units is present. An additional blending unit may also be used to perform other types of blending that are not required on a per texture stage basis.

Figure 5B:
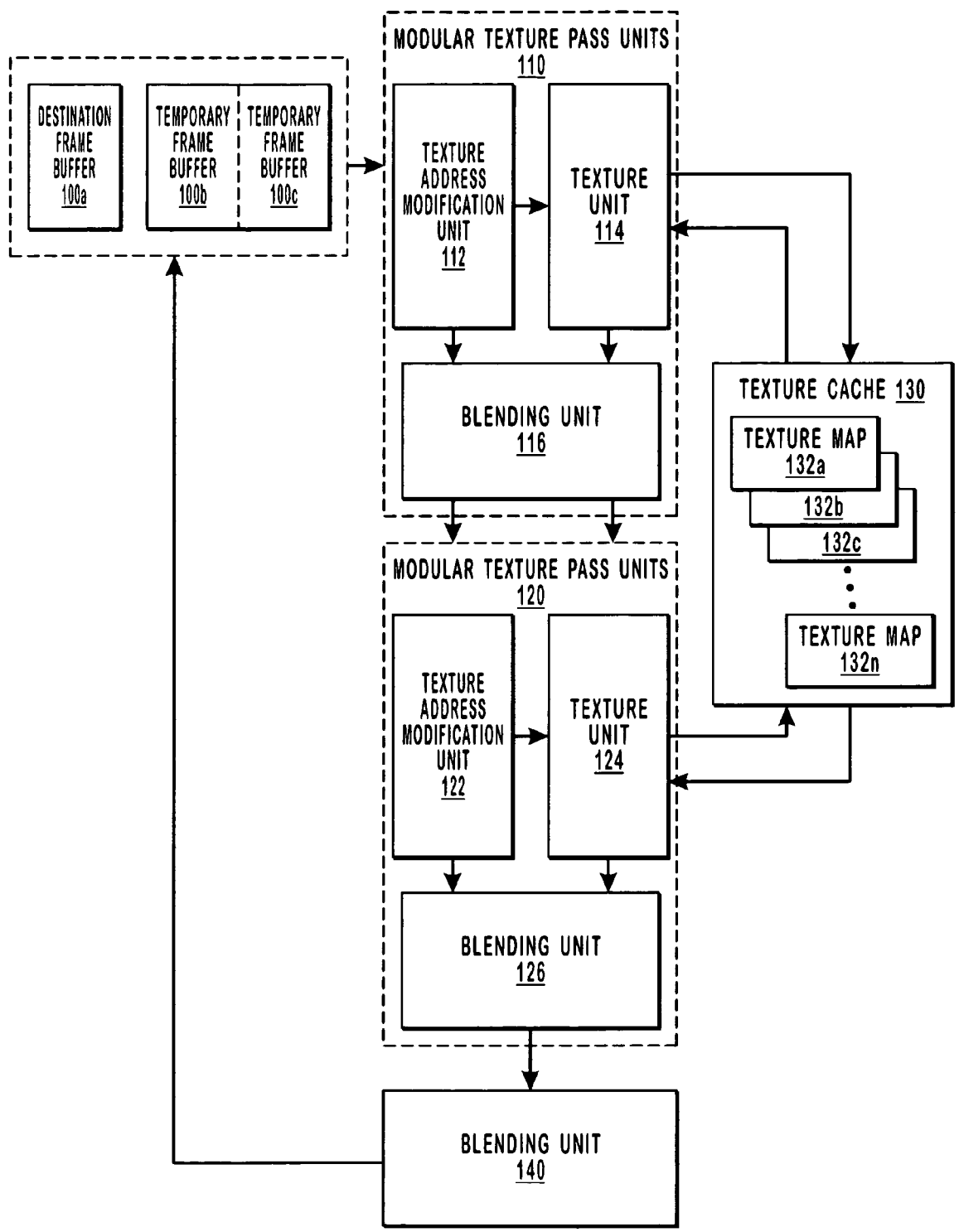
FIG. 5B illustrates an alternative embodiment for utilizing temporary frame buffers in accordance with the present invention.

In the embodiment illustrated in FIG. 5B, two collections of modular texture pass units (e.g. N=2), a texture cache, and an additional blending unit are employed. Furthermore, while up to eight or more texture passes may be performed for each pixel of a frame, the following example references a situation where three texture passes are performed for each pixel of a frame. The destination pixel data is stored in the destination frame buffer 100*a*. In the first pass for a particular pixel, in the polygon, the only u,v texture coordinates sent to the pipeline are ($u_0,v_0$) and ($u_1,v_1$). The texture coordinate value for the first coordinate set ($u_0,v_0$) is obtained by utilizing a first collection of modular texture pass units, such as modular texture pass units 110, to look up the texture coordinate value in a desired texture map, such as texture map 132*a*, located in a texture map repository or library of texture cache 130. The texture map 132*a* may represent, for example, a base map. Therefore, modular texture pass units 110 look up a texture coordinate value for the pixel in texture map 132*a* of texture cache 130 using the texture coordinates ($u_0,v_0$) and blending unit 116 sends the texture values (e.g. α, R, G, B color values) associated with the texture coordinates to the subsequent collection of modular texture pass units, namely modular texture pass units 120.

Modular texture pass units 120 use the ($u_1,v_1$) texture coordinates to look up a texture coordinate value for the pixel in a second texture map, such as texture map 132*b* of texture cache 130, using the texture coordinates ($u_1,v_1$). Texture map 132*b* may represent, for example, a bump map. Instead of being blended with the texture values obtained from the first pass and having the blended texture values stored in a temporary frame buffer, temporary frame buffer 100*b* has been split to create temporary frame buffer 100*c* and the texture values obtained during the first and second passes are separately stored in temporary frame buffers 100*b* and 100*c*. Thus, one of the temporary frame buffers (e.g. temporary frame buffer 100*b*) would contain the temporary values representing the base map and the other temporary frame buffer (e.g. temporary frame buffer 100*c*) would contain temporary values representing the bump map data.

In the final pass, texture values from one or more previous passes are utilized to perform a look up for the current pass. Therefore, by way of example, in the second pass the texture values corresponding to the base map and bump map data are read from temporary frame buffers 100b and 100c and are used by modular texture pass units 110 to perform a look up to a third texture map, such as texture map 132c, which may represent a specular map. In one example, the process includes a matrix transform of the bump map data followed by adding the result to the third set of iterated texture coordinates ($u_3, v_3$). The results from one or more of the passes are then blended with the destination pixel data stored in the destination frame buffer 100a and used to control the pixels on the display device when a frame of the display device is refreshed.

Figure 6:
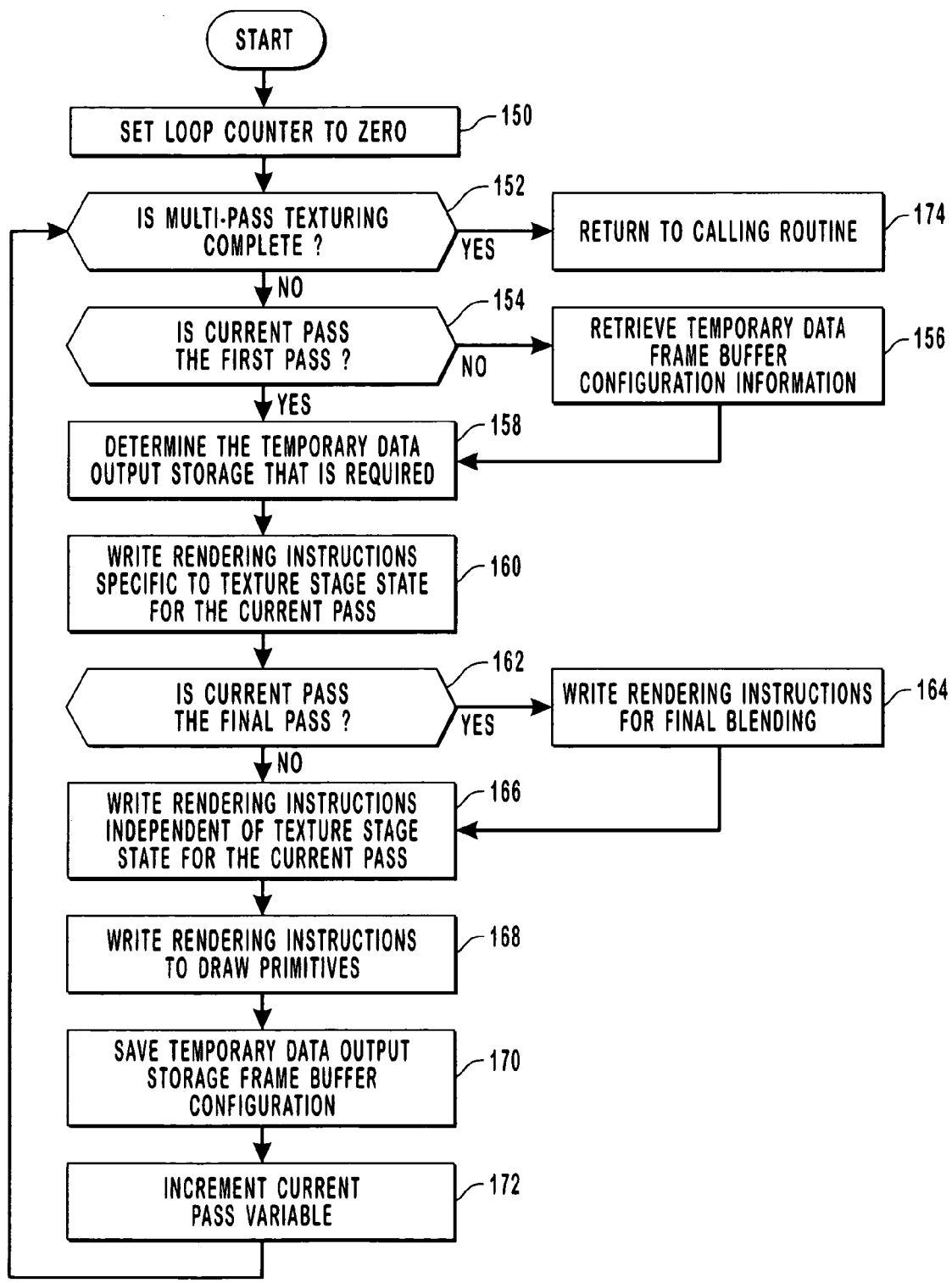
FIG. 6 is a flow chart that provides an exemplary embodiment for performing multiple rendering passes, for storing data from the passes in a plurality of frame buffers, and blending data to render a three-dimensional object.

FIG. 6 illustrates a flow chart that provides an exemplary embodiment for creating rendering engine instructions to perform multiple rendering passes and storing data in frame buffers given one physical texture unit. The flowchart of FIG. 6 would, for example, be executed each time the rendering application programming interface driver is called to render a group of primitives sharing the same rendering state. In FIG. 6, execution begins at step 150 by setting a loop counter to zero. The loop counter includes a pass variable that keeps track of the current pass. Execution then proceeds to decision block 152 for a determination as to whether or not the multi-pass texturing has been completed. If it is determined at decision block 152 that the multi-pass texturing has not been completed, execution proceeds to decision block 154 for a determination as to whether or not the current pass is the first pass. When the current pass is the first pass, this implies that no temporary buffer data needs to be read on the current pass. Alternatively, when the current pass is not the first pass, 0–2 pieces of temporary texture stage data is needed to be read on the current pass.

Therefore, if it is determined at decision block 154 that the current pass is not the first pass, execution proceeds to step 156. At step 156, information is retrieved regarding the temporary data output storage frame buffer configuration. This information is retrieved to facilitate frame buffer reading. As provided in FIG. 6, step 156 is only executed during non-initial passes. Step 156 may also retrieve information regarding any data that is currently stored in the temporary buffer, such as the packing and format of the data, in order to properly configure the pipeline state that controls the reading of the temporary buffer. Execution then proceeds to step 158. Alternatively, if it is determined at decision block 154 that the current pass is the first pass, execution proceeds directly to step 158.

At step 158, the temporary data output storage that is required for writing on this pass is determined, given the texture stage state settings for the current pass number. Subsequently, at step 160, the rendering instructions that are specific to the texture stage state for the current pass are written. In other words, the driver writes a list of rendering instructions that detail the state implied by the texturing and the texture stage state. These write commands detail the state of the rendering engine, which needs to potentially change on a per pass basis due to the various possible multi-pass texturing operations that are available on each pass. Execution then proceeds to decision block 162, which determines whether the current pass is the final pass. If it is determined that the current pass is not the final pass, execution proceeds directly to step 166. Alternatively, if it is determined that the current pass is the final pass, execution proceeds to step 164, where a driver writes the rendering instructions for the final blending. The rendering instructions include, among others, the alpha blending of the pipeline result with the current data in the destination frame buffer in order to implement transparency. Execution then proceeds to step 166.

At step 166, rendering instructions are written that are independent of the texture stage for the current pass. Therefore, the driver writes rendering instructions that are independent of the multi-pass rendering operations and are static for each pass. Execution then proceeds to step 168, which writes the necessary rendering instructions to draw primitives of graphics, such as triangles or points. Execution then proceeds to step 170.

At step 170, the temporary data output storage frame buffer configuration is saved for possible use by the subsequent pass to determine the temporary frame buffer configuration. Step 172 then increments the current pass variable and execution returns to decision block 152 for a determination as to whether or not the multi-pass texturing is complete. If it is determined that the multi-pass texturing is not complete, execution proceeds to decision block 154, which determines that the current pass is not the first pass, and then through steps 156–172. Execution then returns back to decision block 152 for a determination as to whether or not the multi-pass texturing is complete.

Once decision block 152 determines that the multi-pass texturing is complete, execution proceeds to step 174, which returns to the calling routine. As such, the rendering instruction list is now complete for this primitive or group of primitives. The application programming interface/driver is called by the application to render each primitive or group of primitives. Then, when the scene is complete and the application has sent all of its primitives, the application calls the application programming interface/driver to indicate that the scene is complete. This indicates to the driver to create additional rendering instructions for the rendering engine to flush caches. The rendering engine is then invoked to complete the rendering of the frame. Once the rendering of the frame has been completed, the rendering driver informs the display device driver that a new frame is available and the video refreshing operation flips to this new frame.

Therefore, as provided above, embodiments of the present invention relate to systems and methods for providing multi-pass rendering of three-dimensional objects. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computing system having a rendering pipeline for rendering an image that includes a primitive to which texture maps can be applied, wherein the rendering pipeline includes one or more texture units, the computing system comprising one or more computer-readable storage media having computer-executable instructions for implementing a method for applying data obtained from texture maps to a pixel using the one or more texture units, wherein the method comprises:

storing destination pixel data in a destination buffer;

passing at least a first set of texture coordinates associated with the pixel to a texture unit, wherein said first set of texture coordinates is associated with a first texture map;

obtaining first texture data from said first texture map, wherein said first texture data corresponds to the pixel;

storing the first texture data in a first buffer that is separate from the destination buffer storing the destination pixel data;

passing a second set of texture coordinates associated with the pixel to a texture unit, wherein said second set of texture coordinates is associated with a second texture map;

obtaining second texture data from said second texture map, wherein said second texture data corresponds to the pixel;

blending the second texture data with the first texture data stored in the first buffer to produce composite texture data;

storing the composite texture data in the first buffer; and modifying said destination pixel data with the composite texture data from the first buffer to obtain composite pixel data that is used to refresh a display screen.

2. A computing system as recited in claim 1, wherein modifying said destination pixel data comprises:

blending the composite texture data with said destination pixel data to obtain the composite pixel data that is used to refresh a display screen.

3. A computing system as recited in claim 2, wherein the method further comprises:

storing said second texture data in a second buffer.

4. A computing system as recited in claim 3, wherein said second buffer is created by dividing one of said destination buffer and said first buffer.

5. A computing system as recited in claim 3, wherein the method further comprises:

passing a third set of texture coordinates associated with the pixel to a texture unit, wherein said third set of texture coordinates is associated with a third texture map; and obtaining third texture data from said third texture map, wherein said third texture data corresponds to the pixel.

6. A computing system as recited in claim 5, wherein the method further comprises:

blending said third texture data with the composite texture data in the first buffer.

7. A computing system as recited in claim 1, wherein the method further comprises:

creating a second buffer by dividing one of said destination buffer and the first buffer; and storing said second texture data in said second buffer.

8. A computing system as recited in claim 7, wherein the method further comprises:

passing data associated with the pixel from one or more previous passes to a texture unit; and obtaining third texture data from a third texture map.

* * * * *

UNITED STATES PATENT AND TRADEMARK OFFICE
CERTIFICATE OF CORRECTION

PATENT NO.           : 7,095,419 B2                                              Page 1 of 1
APPLICATION NO.  : 11/216251
DATED                   : August 22, 2006
INVENTOR(S)         : Nicholas R. Baker et al.

It is certified that error appears in the above-identified patent and that said Letters Patent is hereby corrected as shown below:

On the title page, item (56), under "U.S. Patent Documents" in column 2, line 1, after "6,741,259" delete "B1" and insert -- B2 --, therefor.

In column 11, line 13, delete "cc" and insert -- $\alpha$ --, therefor.

Signed and Sealed this

Twentieth Day of July, 2010

David J. Kappos
*Director of the United States Patent and Trademark Office*